United States Patent [19]

Morris et al.

[11] Patent Number: 4,619,976
[45] Date of Patent: Oct. 28, 1986

[54] BLENDS OF COPOLYESTERS AND POLYCARBONATE

[75] Inventors: John C. Morris; Winston J. Jackson, Jr., both of Kingsport, Tenn.

[73] Assignee: Eastman Kodak Company, Rochester, N.Y.

[21] Appl. No.: 801,726

[22] Filed: Nov. 26, 1985

Related U.S. Application Data

[63] Continuation of Ser. No. 676,908, Nov. 30, 1984, abandoned.

[51] Int. Cl.$^4$ ........................ C08L 67/02; C08L 69/00
[52] U.S. Cl. ..................................... 525/439; 528/304
[58] Field of Search ......................... 525/439; 528/304

[56] References Cited

U.S. PATENT DOCUMENTS

| | | | |
|---|---|---|---|
| 2,657,195 | 10/1953 | Toland | 528/306 |
| 3,218,372 | 11/1965 | Okamura | 525/439 |
| 3,496,839 | 2/1970 | Hartle | 528/306 |
| 4,124,652 | 11/1978 | Quinn | 525/439 |
| 4,226,961 | 10/1980 | Motz | 525/439 |
| 4,367,317 | 1/1983 | Fox | 525/439 |
| 4,391,954 | 7/1983 | Scott | 525/439 |
| 4,420,607 | 12/1983 | Morris | 528/298 |
| 4,459,402 | 7/1984 | Morris | 528/298 |
| 4,468,510 | 8/1984 | Morris | 528/298 |

Primary Examiner—John C. Bleutge
Assistant Examiner—Patricia Short
Attorney, Agent, or Firm—John F. Stevens; William P. Heath, Jr.

[57] ABSTRACT

Disclosed are blends of polyesters of terephthalic acid, trans-4,4'-stilbenedicarboxylic acid, and bisphenol A polycarbonate. The polymers are compatible, and blends prepared from these polymers have excellent impact strength and are useful as molding plastics, fibers, and films.

5 Claims, No Drawings

BLENDS OF COPOLYESTERS AND POLYCARBONATE

This is a continuation of application Ser. No. 676,908 filed on Nov. 30, 1984, now abandoned.

TECHNICAL FIELD

This invention relates to blends of high molecular weight polyesters and polycarbonates which are compatible and useful as molding plastics, fibers, and films. The blends are transparent, exhibit a single glass transition temperature, have high impact strength, and have improved low temperature impact strength. This invention is particularly concerned with blends of high molecular weight copolyesters of terephthalic acid, trans-4,4'-stilbenedicarboxylic acid, and 1,4-cyclohexanedimethanol with bisphenol A polycarbonate.

This invention provides transparent molding plastics with high impact strength, high heat resistance and improved low temperature impact strength.

BACKGROUND OF THE INVENTION

The copolyester portion of this invention is described in U.S. Pat. Nos. 4,420,607, 4,459,402, and 4,468,510. Of these patents, U.S. Pat. Nos. 4,420,607 and 4,468,510 specifically disclose polyesters of terephthalic acid and 1,4-cyclohexanedimethanol modified with 50 to 100 mol % trans-4,4'-stilbenedicarboxylic acid (see Table 1 in each patent). No examples of blends of these copolyesters are contained in these patents.

Other art related to trans-4,4'-stilbenedicarboxylic acid include: U.S. Pat. Nos. 2,657,194, 2,657,194, 3,190,174, 3,247,043, 3,496,839, 3,842,040, 3,842,041, 4,073,777, and Japanese Kokai No. 72348/74. In addition, polyesters of trans-4,4'-stilbenedicarboxylic acid and neopentyl glycol, 1,5-pentanediol, 1,6-hexanediol, and 1,10-decanediol are disclosed by Meurisse, et al, in the *British Polymer Journal*, Vol. 13, 1981, p 57 (Table 1). None of these references disclose examples of blends of the copolyesters and polycarbonates of our invention.

Our copending application filed of even date herewith claims the copolyesters used in this invention.

DISCLOSURE OF THE INVENTION

The polymers of this invention are useful as molding plastics, fibers, films, and bottles. Generally, blends of two distinctly different polymers are opaque and incompatible with one another. Unexpectedly, we have discovered that injection-molded bars consisting of blends of about 5 to about 95 wt % of copolyesters of terephthalic acid, trans-4,4'-stilbenedicarboxylic acid (SDA), and 1,4-cyclohexanedimethanol with about 95 to about 5 wt % of bisphenol A polycarbonate are compatible, transparent molding plastics having a single glass transition temperature ($T_g$), high impact strength, and good heat resistance (Table 1).

The copolyester portion of these blends contains repeating units from about 95 to about 30 mol % terephthalic acid, preferably about 95 to about 40 mol %, and repeating units from about 5 to about 70 mol % trans-4,4'-stilbenedicarboxylic acid, preferably about 5 to about 60 mol %, such that the sum of the dicarboxylic acid portion of these copolyesters is equal to 100 mol %. The dicarboxylic acid portion of these copolyesters may contain up to 30 mol % of other aromatic dicarboxylic acids having 8 to 20 carbon atoms such as isophthalic acid, 2-chloro- or 2,5-dichloroterephthalic acid, 2-methylterephthalic acid, 4,4'-biphenyldicarboxylic acid, and 2,6-naphthalenedicarboxylic acid. Terephthalic acid is preferred.

The 1,4-cyclohexanedimethanol portion of the copolyesters of this invention may consist of either trans-1,4-cyclohexanedimethanol or cis-1,4-cyclohexanedimethanol or any mixture of these isomers. A mixture of isomers consisting of 70 mol % trans-1,4-cyclohexanedimethanol which is commercially available is preferred. The 1,4-cyclohexanedimethanol portion of the polymer may also contain up to 40 mol %, preferably less than 20 mol %, of another aliphatic glycol containing 2 to 10 carbon atoms such that the sum of the glycol portions of the polymer is equal to 100 mol %. Examples of useful glycols are ethylene glycol, 1,2-propanediol, 1,3-propanediol, 2,2-dimethyl-1,3-propanediol, trans- or cis-2,2,4,4-tetramethyl-1,3-cyclobutanediol, 1,4-butanediol, 1,5-pentanediol, 1,6-hexanediol, 1,3-cyclohexanedimethanol, or p-xylenediol.

The polycarbonate portion of the blend consists of the polycarbonate of 4,4'-isopropylidenediphenol (bisphenol A).

Many such polycarbonates are commercially available, and are normally made by reacting bisphenol A with phosgene, diethyl carbonate, etc.

The inherent viscosity of the copolyester portion of the blends is at least 0.3 but preferably 0.6 or more. The inherent viscosity of the bisphenol A polycarbonate portion of the blends is at least 0.3 but preferrably 0.5 or more. The polyester portion of these blends is prepared in the melt or by solid-phase polymerization or by a combination of these processes according to well-known techniques. The polycarbonate portion of the blends is prepared in the melt, in solution, or by interfacial polymerization techniques well known in the art.

The examples illustrate the single glass transition temperature, good heat resistance, and high impact strength of these compatible transparent polyester/polycarbonate blends of our invention. The high notched Izod impact strength at −40° is particularly surprising.

The inherent viscosities of the copolyesters of this invention are determined at 25° C. in 60/40 (wt/wt) phenol/tetrachloroethane at a concentration of 0.5 g/100 mL. The inherent viscosities of the polycarbonates and the polyester/polycarbonate blends are determined at 25° C. in 25/35/40 (wt/wt/wt) phenol/tetrachloroethane/p-chlorophenol at a concentration of 0.1 g/100 mL.

The polyesters and polycarbonates are ground to pass a 3-mm screen, dry-blended, dried at 80°–120° C. overnight in a vacuum oven, and mixtures are extruded at 290° to 320° C. on ¾-inch Brabender extruder equipped with a screen pack and a mixing screw.

The polymers are molded on a one-ounce Watson-Stillman injection-molding machine to give 5×½×⅛-inch flexure bars. The notched Izod impact strength is determined by taking an average of five breaks following the procedure of ASTM D256. The heat defection temperature is determined following the procedure of ASTM D648.

The glass transition temperatures of the blends are determined on a Perkin-Elmer DSC-2 Differential Scanning Calorimeter at a scan rate of 20° C./minute.

The following examples are submitted for a better understanding of the invention.

EXAMPLE 1

This example illustrates the preparation of a typical polyester component of the blends of this invention. A copolyester consisting of 60 mol % terephthalic acid units, 40 mol % trans-4,4'-stilbenedicarboxylic acid units, and 100 mol % 1,4-cyclohexanedimethanol units is prepared as follows.

A mixture of 87.5 g (0.45 mol) dimethyl terephthalate, 88.8 g (0.30 mol) dimethyl trans-4,4'-stilbenedicarboxylate, 185.1 g (0.90 mol) 70% trans/30% cis 1,4-cyclohexanedimethanol (70% solution in methanol), and 0.14 g titanium tetraisopropoxide is placed in a one-liter flask equipped with an inlet for nitrogen, a metal stirrer, and a short distillation column. The flask is gradually heated to 190° C. to allow the excess methanol to distill. The flask is then heated about 20 minutes at 190° C., 20 minutes at 220° C., and 20 minutes at 280° C. The reaction temperature is raised to 300° C. and a vacuum of 0.5 mm is gradually applied. Full vacuum is maintained for about 50-60 minutes. A light yellow, high-melt viscosity polymer is obtained with an I.V. of 0.83 and a Tg of 120° C.

The polymer is ground, dry blended with 30 wt % of ground Lexan 303 polycarbonate (a polycarbonate of bisphenol A and phosgene, I.V.=0.61), extruded at 290° C., and pelletized. The pelletized polymer blend is molded at 290° C. to give transparent molded flexure bars with a notched Izod impact strength of 14.5 ft-lb/in. at 23° C. and 11.3 ft-lb/in. at −40° C., a 264 psi heat deflection temperature of 105° C., and a Tg of 126° C.

EXAMPLE 2

The polyester of Example 1 is ground, dry blended with 50 wt % Lexan 303 polycarbonate, extruded at 290° C. and pelletized. The pelletized polymer blend is molded at 290° C. to give transparent molded flexure bars with a notched Izod impact strength of 17.3 ft-lb/in. at 23° C. and 14.8 ft-lb/in. at −40° C., a 264 psi heat deflection temperature of 108° C., and a Tg of 133° C.

EXAMPLE 3

The polyester of Example 1 is ground, dry blended with 70 wt % Lexan 303 polycarbonate, extruded at 290° C. and pelletized. The pelletized polymer blend is molded at 290° C. to give transparent molded flexure bars with a notched Izod impact strength of 16.7 ft-lb/in. at 23° C., 9.6 ft-lb/in. at −40° C., a 264 psi heat deflection temperature of 124° C., and a Tg of 140° C.

The polyesters and blends of the remaining examples in Table 1 are prepared using the procedures of Example 1. The examples illustrate the superior properties of the blends at various ratios of SDA and TPA, and various ratios of copolyester and polycarbonate.

TABLE 1

Notched Izod Impact Strength of Blends of T(SDA)(CDM)[a]/Polycarbonate Blends

| Copolyester | | SDA Copolyester Lexan 303 Ratio Wt/Wt | Blend I.V. | Tg °C. | Notched Izod Impact Strength, Ft-Lb/In. | | Example No. |
|---|---|---|---|---|---|---|---|
| TPA, Mol % | SDA, Mol % | | | | 23° C. | −40° C. | |
| 0 | 0 | 0/100 | 0.61 | 150 | 18.0 | 2.3 | — |
| 95 | 5 | 50/50 | 0.84 | 124 | — | — | — |
| 60 | 40 | 95/5 | 1.02 | 118 | — | — | — |
| " | " | 70/30 | 0.83 | 126 | 14.5 | 11.3 | 1 |
| " | " | 50/50 | 0.81 | 133 | 17.3 | 14.8 | 2 |
| " | " | 30/70 | 0.76 | 140 | 16.7 | 9.6 | 3 |
| " | " | 5/95 | 0.68 | 147 | — | — | |
| 30 | 70 | 50/50 | 0.76 | 136 | — | — | — |

[a]T = terephthalic acid,
SDA = trans-4,4'-stilbenedicarboxylic acid,
CDM = 70/30 trans/cis 1,4-cyclohexanedimethanol.

We claim:

1. Composition of matter comprising (a) about 5-95% by weight of a polyester comprising repeating units from about 30 to about 95 mol % terephthalic acid, repeating units from about 5 to about 70 mol % trans-4,4'-stilbenedicarboxylic acid and repeating units from at least 60 mol % 1,4-cyclohexanedimethanol, said polyester having an inherent viscosity of 0.3 or more determined at 25° C. in 60/40 (wt/wt) phenol/tetrachloroethane at a concentration of 0.5 g/100 mL and (b) about 95-5% by weight of a polycarbonate of 4,4'-isopropylidenediphenol with an inherent viscosity of at least 0.3.

2. A composition according to claim 1 wherein the terephthalic acid repeating units of the polyester are present in an amount of about 40-95 mol % and the trans-4,4'-stilbenedicarboxylic repeating units acid are present in an amount of about 5-60 mol %.

3. A composition according to claim 1 wherein the acid component of the polyester comprises repeating units from up to 30 mol % of at least one other aromatic dicarboxylic acid having 8 to 20 carbon atoms.

4. A composition according to claim 1 wherein said 1,4-cyclohexanedimethanol contains at least 70% trans isomer.

5. A composition according to claim 1 wherein the I.V. of the copolyester is greater than 0.6.

* * * * *